UNITED STATES PATENT OFFICE.

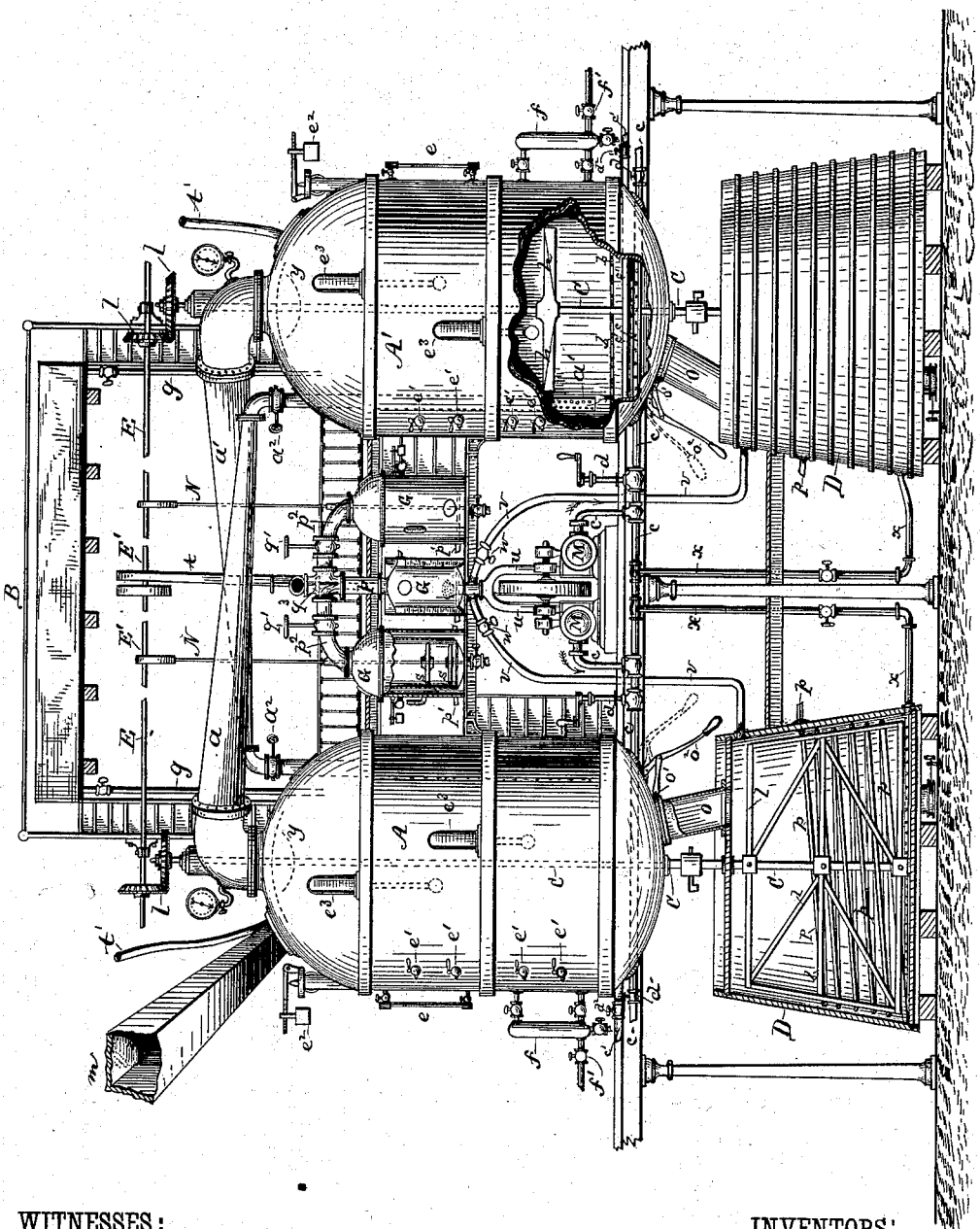

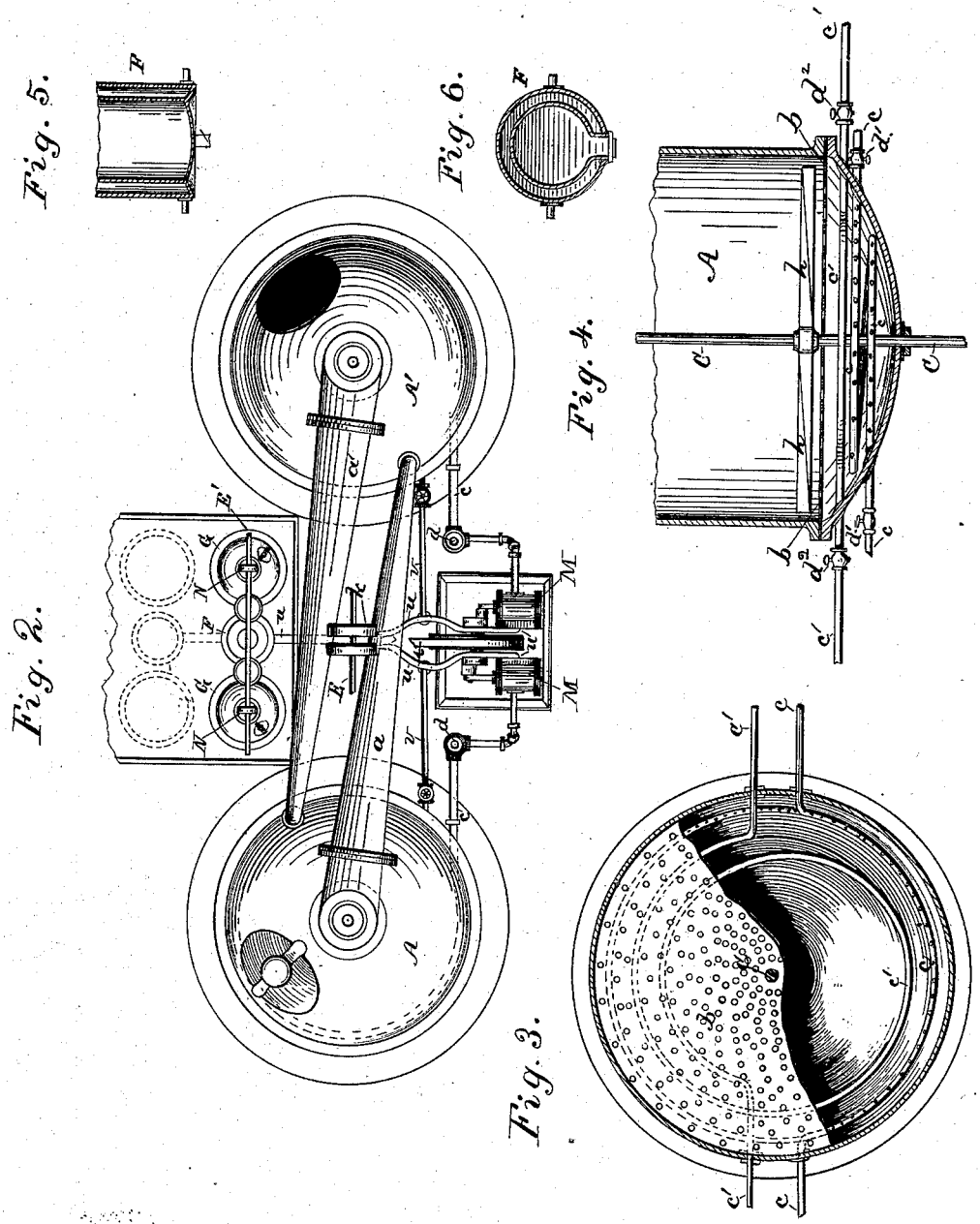

ALEXANDER C. LANDRY AND CHARLES LAUGA, OF NEW ORLEANS, LA.

METHOD OF AND APPARATUS FOR CONVERTING AMYLACEOUS AND LIGNEOUS SUBSTANCES INTO GRAPE-SUGAR.

SPECIFICATION forming part of Letters Patent No. 278,562, dated May 29, 1883.

Application filed September 16, 1882. (No model.)

*To all whom it may concern:*

Be it known that we, ALEXANDER CHARLES LANDRY and CHARLES LAUGA, of New Orleans, in the parish of Orleans and State of Louisiana, have invented certain new and useful Improvements in Methods of and Apparatus for Converting Amylaceous and Ligneous Substances into Grape-Sugar; and we hereby declare that the following is a full, clear, and exact description of the invention.

The object of our invention is to effect the transformation of amylaceous and ligneous substances into grape-sugar or glucose with a greater economy than heretofore; and to this end we have devised the apparatus and process hereinafter described.

The chief or most important feature of the process whereby the desired conversion is effected is the employment, in a gaseous or nascent condition, of a reagent having for its basis either chloric or hypochloric acid, and is obtained by combining an alkaline chlorate or perchlorate with an organic or inorganic acid; and for this purpose chlorate or perchlorate of potash and oxalic acid have the preference.

The chief or most important feature of the apparatus is the construction and combination of parts whereby the gaseous oxygenating agent employed may be forced from one converting-vessel into another, so that waste thereof is avoided as far as practicable.

We will proceed to describe the apparatus, reference being had to the accompanying drawings, in which—

Figure 1 is a side elevation of the same, some parts being in section or broken away. Fig. 2 is a plan view of the converters, gas-generators, and pump, some of the attachments thereof being omitted. Fig. 3 is a cross-section of one of the converters, a portion of the false bottom being broken away. Fig. 4 is a vertical section of the lower portion of a converter. Fig. 5 is a vertical section, and Fig. 6 a horizontal section of a portion of one of the gas-generating vessels.

The letters A A' indicate twin vessels, which, being used for containing the amylaceous and ligneous substances to be converted into grape-sugar, may be appropriately termed "converters." They are hermetically closed, and constructed of wood or metal; but if the latter material, they require to be lined with some substance not subject to chemical action by the reagents used to effect the conversion.

From the upper conical extremity of each converter A A' a tapered tube, $a$ $a'$, extends horizontally to the adjacent converter, passes down through the top of the latter nearly to its perforated false bottom $b$, and is provided with a stop-cock, as shown. The lower portions of these tubes $a$ $a'$ are perforated to allow free escape of the oxygenating-gases that are forced through them from one converter into the other, as hereinafter described.

Beneath each false bottom $b$ are two pipe coils or worms, $c$ $c'$, Figs. 3, 4. The perforated coil $c$ is connected with the gas and air pump at one end, and with a steam-generator (not shown) at the other end, and is also provided with stop-cocks, $d$ $d'$, accessibly located, so that gas or steam may be admitted into the converter. In practice they are admitted alternately. The other coil, $c'$, is imperforate or closed and connects with the steam-generator. (Not shown.) It is also provided with a stop-cock, $d^2$, so that steam may be admitted to the pipe $c'$ when required for raising the temperature of the contents of the converter.

Each converter A A' is provided with a liquid-gage, $e$, try-cocks, $e'$, a safety-valve, $e^2$, and thermometer $e^3$, whose construction, attachment, and operation, being of the usual character, require no description.

Near the bottom of each converter A A' is a sampling-tube, $f$, having a cock at its lower end to allow samples to be taken when desired, and still another cock, $f'$, is provided in connection with the sampler $f$ to permit introduction of steam for the purpose of cleaning the latter.

Above the converters A A' is placed a water-tank, B, from which pipes $g$ extend down into the converters A A'. A shaft, C, extends vertically through each converter and is prolonged into a tank, D, below the latter. Between the said converters and tanks the shafts C are divided and coupled, so that the lower portion may be easily detached from the upper when required. The shafts C are provided with radial arms $h$ within the converters A A', and within the hermetically-closed tanks D D a skeleton frame, $i$, is attached to them, by which means, when the shafts are revolved, the contents of both converters and tanks are agitated and thoroughly commingled. Rotary motion is imparted to the shafts C C from the driving-shaft E through the medium of bevel-gearing $l$, whose arrangement and operation will be readily understood from Figs. 1 and 2 without further description.

The substance to be treated is conveyed into the converters by means of a spout, $m$, or any other suitable device, and the converted or saccharified matter is discharged into tanks D through a pipe, $o$, having a sliding valve, $o'$, operated by a lever, $o^2$. After delivery into said tanks D the converted mass is cooled to any desired degree by means of a coil or worm, $p$, arranged in the tanks, and through which a current of cold water may be conducted from any suitable source of supply. When cooled the contents are allowed to discharge by opening the sliding valves at the bottom of the tanks.

The letters F F G indicate vessels employed for generating the gas used in vessels A A for effecting the desired saccharification of the grain or other amylaceous body placed therein, the said gas being forced in by the pump M. We show in this instance two sets or batteries of such gas-generators. Each of said vessels F F G is hermetically closed, also provided with a jacket, which incloses a space for receiving steam (live or exhaust or superheated) for the purpose of heating their contents, and the vessel G is similarly provided with a jacket for receiving water through pipe $p'$, Fig. 1, for cooling its contents. All of said vessels are connected by pipes $p^2$ and provided with valves $q'$ $q'$, by which either vessel may be cut off from communication with one or both of the others, as will be better understood from the description of the operation of the apparatus hereinafter given. The valve $q^2$ of the pipe $p^2$, leading to vessel G, is adapted to open inward for the purpose of admitting air. An agitator is provided for each of the gas-generators F F, the same consisting of a rod, $r$, having arms $s$ within the latter, and a plunger, N, connected with the counter-shaft E' by an eccentric, so that a vertically-reciprocating motion is imparted to them. The generators F F are provided with man-holes for introduction of the chemical substances from which the gas is generated, and the intermediate vessel, G, has a similar man-hole for general purposes. Man-holes are also provided at the bottom of vessels F F, for the purpose of removing the waste contents thereof and to facilitate cleaning their interiors. The middle vessel, G, is connected by means of the bifurcated pipe $u$ with the twin cylinder-pump M, which is operated by a belt, $t$, from the same shaft E which drives the agitating apparatus, before described. The vessels T T are suitably provided with safety-valves, thermometers, &c. The oxidizing substances, from which are formed the gases employed for converting the amylaceous or other bodies are any alkaline chlorate or perchlorate of potash and oxalic or muriatic acid. These are broken up and ground to powder and thoroughly mixed together, and introduced into the vessels F F through the man-holes. If the acid be used in liquid form, the solution should be a highly-concentrated one. The relative proportions in weight of the chlorate and acid should be proportionate to that of their respective chemical equivalents.

The operation of the apparatus and the process of treatment of the bodies to be converted into glucose are as follows: The cornmeal or other substance to be converted is introduced into the first vessel, A, through the opening. At the same time a quantity of weak glucose-liquor, obtained in the final washing of the solid residuum in the filter-press, is inducted through the pipe $t'$ at the top of the converter. Water is also admitted from tank B through pipe $g$. The proportions of said glucose-liquor and water may be equal, and the aggregate quantity required is about ten or twelve gallons for each bushel of grain. The agitator C $h$ is then set in motion for the purpose of thoroughly commingling the contents of the converter A. Steam is also simultaneously let into the imperforate and closed pipes $c'$ for the purpose of raising the temperature of the mass to 190° Fahrenheit, and when this has been done steam is shut off, all openings are closed, the cocks $q'$ opened, and the commingled gases and atmospheric air passing from receiver G through pipe $u$ to pump M, and are forced into the converter A through the perforated pipe or worm $c$. The agitator C $h$ being kept in motion, these gases readily permeate the mass and come in contact with every particle of the same, so that a very perfect conversion is effected. When the usual tests and reagents—iodine, alcohol, cupric liquors, and the saccharometer, &c.—indicate the desired conversion has taken place, the admission of gases, &c., is cut off by turning cock $d$ in pipe $c$, and the cock $d'$ on the other side of converter is then opened to allow discharge of steam from the perforated pipe $c$ into the now transformed mass. The action of the steam liberates the gases that are not assimilated, and rapidly forces them out of the converters through pipe $a$ (the cock $a^2$ having been opened for the purpose) into the twin converter A', wherein a charge of meal, weak glucose-liquor, and water has been admitted, mixed, and heated to the proper degree (190° Fahrenheit) while the conversion has been thus going on in the first converter, A. Thus the gases, which are still chemically active after the conversion of the first charge, are utilized in the treatment of the next, thereby avoiding loss and effecting a considerable economy in the converting process. After the first charge has been converted the gas-generators F F are therefore only required to furnish such additional quantity of gas as is necessary to supply the deficit resulting from the loss of gas, which inevitably attends the operation on each charge. While conversion is going on in the second vessel, A', the first one, A, is being discharged and recharged, and at the proper time the free gases in the second converter, A', are forced back through pipe $a$ into the first converter, A, where they effect such further conversion as they are capable of, and thus the operation of alternate charging and forcing of gases from one converter into the other is continued. As before intimated, the converted mass is discharged into tanks D and cooled by water passed through pipe $p$ while being agitated by the revolving stirrer C $i$.

In further explanation of the operation we will state that the generation of the gas in the vessels F F is promoted by the churning action of the device N $s$ and by admission of steam into the jacketed space surrounding said vessels. The object of the commingling of atmospheric air with the gases as they emerge from the generators F F is to cool said gases, and also lessen the energy of their chemical action on the substance in the converters by the admixture of the nitrogen of the atmosphere. The middle vessel, G, serves as a reservoir, wherein the gas and air are mingled and cooled by the introduction of cold water to the jacketed space surrounding it.

The pump M is connected with the upper portion of tanks D D, by means of pipes $v$, having cocks $w$, so that if any unabsorbed gas passes into said tanks along with the converted mass, it may be removed into the converters A A'. This pump is furthermore connected with the bottom of tanks D D by means of the pipes $x$, which are coiled and perforated within the latter, for the purpose of injecting gas when desired to store it therein in case of emergency. The pipes $x$ connect with pipe $c$. The free steam injected into the converted mass in the vessels A A' through pipe $c$, as before described, will expel nearly all the gas, and what remains is not enough to injure the mash if raised to a high temperature. The mash may therefore be raised to 221° Fahrenheit with impunity, to entirely drive off the gas.

During the process of saccharification, and also after the free steam has been injected, the heated mash in the converters might tend occasionally to overflow or pass from one to the other, and, to guard against this contingency, checks in the form of concave-convex plates $y$ are arranged near the upper outlet, as shown in dotted lines, Fig. 1. One of the check-plates $y$ is placed beneath the other, with its concave side uppermost and opposed to the corresponding side of the other.

The ground grain treated in the converters may be bolted, and the oil may be removed by means of any suitable dissolving agent, if found desirable.

Having thus described our invention, what we claim as new is—

1. The application of oxygenated chlorine in gaseous form for the conversion into glucose of amylaceous and other saccharine bodies, substantially as described.

2. In an apparatus for converting saccharine bodies into glucose, the combination of twin converting-vessels having connecting communicating tubes through which gas may be conducted from one to the other in alternation, as and for the purpose herein specified.

3. In an apparatus for converting saccharine bodies into glucose, the combination, with a converter or vessel for containing the body to be treated, of a tank placed below the same for receiving the converted mass, and an agitator consisting of a shaft extending through both converter and tank, and provided with arms, or equivalents, all as shown and described, to operate as specified.

4. In an apparatus for converting saccharine bodies into glucose, the combination, with a converter or vessel for receiving the substance to be treated, of the gas-generating vessels, and means for forcing the gas into said converter, substantially as specified.

5. In an apparatus for converting saccharine bodies into glucose, the combination, with a vessel, A', in which the conversion is effected, of the gas-generating vessels F F, and reservoir G', having an air-inlet, and the pump and connecting-pipe for forcing and conducting gas into said vessel A', as shown and described, for the purpose specified.

6. In an apparatus for converting saccharine bodies into glucose, the combination, with the converters A' A' and tanks D, arranged below them, of the pump and pipes which connect the latter with the upper portion of said tanks, and pipes for conducting into the converters the unabsorbed gas drawn from the tanks, as shown and described.

7. In an apparatus for converting saccharine bodies into glucose, the combination, with the converter and a gas-generator, of a jacket surrounding the latter, and a pipe for conveying steam into the annular space inclosed by said jacket, as and for the purpose specified.

8. In an apparatus for converting saccharine bodies into glucose, the combination, with the gas-generators F F and intermediate gas and air mixing vessel, G, of a jacket surrounding the latter, and a water-pipe communicating with the space inclosed by said jacket, all as shown and described, for the purpose specified.

ALEXANDER CHARLES LANDRY.
CHARLES LAUGA.

Witnesses:
M. M. COHEN,
G. LE GARDEUR, Jr.